May 22, 1928.
R. A. BROOKS
1,670,300
FLOAT CONTROLLED ADMISSION VALVE
Filed July 3, 1926
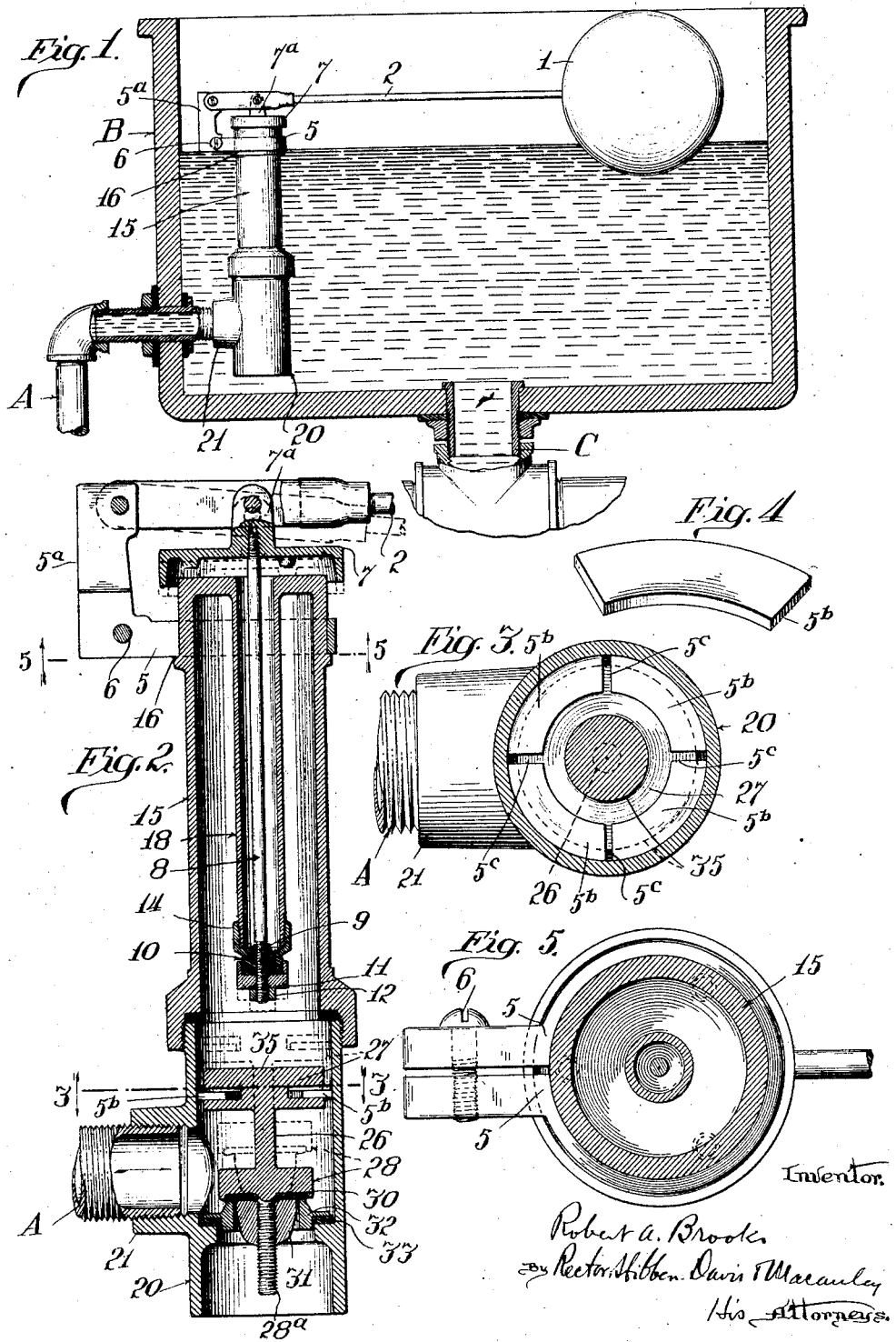
Inventor.
Robert A. Brooks
By Rector, Hibben, Davis & Macauley
His Attorneys Patented May 22, 1928.

UNITED STATES PATENT OFFICE.

1,670,300

ROBERT A. BROOKS, OF CHICAGO, ILLINOIS.

FLOAT-CONTROLLED ADMISSION VALVE.

Application filed July 3, 1926. Serial No. 120,368.

My invention relates to a float-controlled inlet valve which is designed to control the admission of water from a service pipe into a receptacle, such as the master tank of a battery of water-closets or other apparatus in which it is desired to maintain a supply of water at an approximately constant level. The object of my invention, in general, is to provide a valve which by reason of certain novel features of construction shall be in large degree free from the liability to sticking because of sand or other foreign matter in the water supply, and which shall close gradually and easily without noise or water hammer such as other valves of this general type are subject to. With these and incidental objects and advantages in view I have designed and invented the float-controlled admission valve hereinafter described in detail, the essential element of my invention being more particularly pointed out in the appended claims.

In the accompanying drawing Figure 1 is a section of a water tank showing in elevation one of my novel admission valves installed therein; Fig. 2 is a central vertical section of the valve; Fig. 3 is a horizontal section on the line 3—3 of Fig. 2 illustrating the arrangement of four arcuate members which shift radially (and also axially) to control the flow of water governing the closing movement of the valve; Fig. 4 is a perspective view of one of the members; and Fig. 5 is a horizontal section on the line 5—5 of Fig. 2, looking upward, as indicated by the arrow.

Like reference characters indicate like parts in all the figures of the drawing.

The service pipe A which passes through the side of the tank B, making sealed connection therewith, is in the present instance threaded to receive the interiorly threaded intake boss 21 of the valve body 20 of the valve. To the upper end of the valve body is secured a cap portion 15, around the upper end of which is clamped a split yoke 5 which by means of a set screw 6 may be secured to said cap portion 15, a shoulder 16 on such cap portion serving as a seat to position the clamp thereon. Integral with one end of the clamp a post 5ª serves as a support for the inner end of the float stem 2 which carries the float 1.

It may first be explained that when the level of water in the tank falls (as by the operation of flushing devices, not shown, in communication with the outlet of the tank) the lowering of the float causes an auxiliary control or relief valve 10 to open, and this in turn automatically brings about a shifting of the inwardly-opening main valve 28 which permits water to flow into the tank until the raising of the float causes both valves to again close.

Describing now the construction of the main valve and associated parts, the valve body is formed with a lower discous portion 28 recessed to receive a leather or composition valve disk 30, and a depending stem 28ª, upon which is threaded a throttling plug in the form of a clamping nut 31 having a curved lower face. The valve body also includes an upwardly extending stem 26 and at the top of such stem a circular piston head 35 of slightly less diameter than the surrounding face of the piston chamber in the valve body. This piston head is formed with a deep annular groove or recess 27 within which are arranged four arcuate plates 5ᵇ, (see Figs. 3 and 4) which when in radially innermost position together form a composite annular disk, and when in outer position are separated by narrow radial gaps 5ᶜ, the combined area of which is of less area than the valve opening of the relief valve 10, above mentioned and hereinafter described in detail. The thickness of the members 5ᵇ is less than the width of the recess 27, but more than one-half such width, so that the members are capable of movement both radially and axially of the piston head, but cannot shift to overlapping position. Functionally the plates 5ᵇ act as a part of the piston head, and this piston has a larger pressure area than the main valve.

The valve seat member 32 with which the main valve and nut 31 cooperate rests upon a packing washer 33 seated on an internal shoulder formed around the lower outlet opening of the valve body 20.

The cap portion 15 of the valve is formed with a depending water outlet tube 18, the lower end of which is equipped with a coned valve seat 14. The auxiliary control valve heretofore mentioned and which cooperate with said seat is carried by the threaded lower end of a valve stem 8, and as shown, may suitably consist of a coned guide 9, a valve disk 10, a recessed clamping block 11, and a locking nut 12. The upper end of the valve stem is secured to a splash cap 7 formed with ears 7ª by which it is pivoted to the float stem 2. The space between the water outlet tube 18 and the wall of the cap member 15, it may here be explained, forms a compression chamber in which air is trapped and is never filled with water.

With the construction and arrangement of parts above described and the tank filled with water to its normal level the main and auxiliary valve are both closed and the water in the lower part of the valve body and the air in the compression chamber above are under the normal pressure of water in the service pipe. When the water level in the tank lowers sufficiently to open the auxiliary relief valve through its connection with the float, the relief valve is opened and the pressure in the adjacent part of the valve body reduced to that of the atmosphere. This causes an upward rush of water which initially raises and also shifts radially or expands the arcuate plates 5ᵇ, the water escaping to the space above only through the small openings 5ᶜ. The pressure acting against the lower side of the piston head therefore preponderating over that tending to hold the admission valve to its seat, the piston immediately shifts to uppermost position, fully opening the admission valve, where it remains until the lifting of the float valve causes the relief or control valve 10 to close and brings about the subsequent automatic closing of the main valve.

As soon as the relief valve is closed the pressure of the water on the lower side of the piston head forces water gradually through the restricted openings 5ᶜ between the arcuate members 5ᵇ, and builds up an increasing pressure above the piston head. As the piston head and main valve lower, in consequence of the compression above the piston, the rounded head of the throttling plug 31 enters the valve outlet and gradually throttles the flow of water therethrough, thus increasing the pressure on the lower side of the piston head as the pressure above it increases. Meanwhile the slight differential in pressure above and below the piston acts to hold the arcuate plates 5ᵇ in upper position, and the combined action of the parts causes the admission valve to continue its closing movement quietly and without water hammer until it finally seats and full compression in the air-compression chamber is established, the arcuate plates then returning to lower position, and being free to shift loosely inwardly away from the inner face of the piston chamber.

The movement of the arcuate plates 5ᵇ in the operation of the valve renders the valve self-cleaning and wholly obviates any tendency of the piston head to stick because of mechanical obstruction from particles of sand or sediment of any kind in the water supply, to which valves employing a loose fitting retarding piston have been found in practice to be extremely liable. In the operation of my improved valve the arcuate plates are lifted as described and the pressure of the water tends to force the plates outwardly into contact with the wall of the piston chamber, dislodging adherent particles and cleaning the wall as the piston rises. So long as the plates remain in uppermost position the flow of water is through the gaps between the plates only, and upon the return of the plates to lowermost position after the main valve closes they act to dislodge any foreign particles adjacent the wall of the piston chamber. The piston head is of sufficiently smaller diameter than the chamber to afford free passage to particles of foreign matters, and the plates are free to yield to permit the passage of such particles past them. Moreover, the wear upon the wall of the piston chamber is sustained entirely by the curved outer edges of the plates and does not affect the size of the leak openings between them, so that long usage does not affect the proper functioning of the device.

I claim:

1. A float-controlled valve comprising a valve body having a piston chamber open to water under pressure, an inwardly opening main valve in said chamber, a loosely mounted piston in said chamber connected with said valve and having a larger pressure area than said valve, an air-compression chamber communicating with said piston chamber above the piston, a water outlet tube having its inner end opening into the lower end of said compression chamber, a relief valve controlling the passage of water through said tube, and a float arranged to control the opening and closing of said relief valve.

2. A float-controlled valve comprising a valve body having a piston chamber open to water under pressure, an inwardly opening main valve in said chamber, a piston in said chamber of less diameter than said chamber, said piston being formed with a peripheral groove, a plurality of radially movable arcuate members in said groove, an air-compression chamber communicating with said piston chamber above the piston, a water outlet tube having its inner end opening into the lower end of said compression chamber, a relief valve controlling the passage of water through said tube, and a float arranged to control the opening and closing of said relief valve.

3. A float-controlled valve comprising a valve body having a piston chamber open to water under pressure, an inwardly opening main valve in said chamber, a piston in said chamber of less diameter than said chamber, said piston being formed with a peripheral groove, a plurality of radially movable arcuate plates in said groove, said plates being of less width than said groove, an air-compression chamber communicating with said piston chamber above the piston, a water outlet tube having its inner end opening into the lower end of said compression chamber, a relief valve controlling the passage of water through said tube, and a float arranged to control the opening and closing of said relief valve.

4. A float-controlled valve comprising a valve body having a piston chamber open to water under pressure, an inwardly opening main valve in said chamber, said valve being equipped with a throttling plug arranged to gradually vary the size of the valve opening, a loosely mounted piston in said chamber connected with said valve and having a larger pressure area than said valve, an air-compression chamber communicating with said piston chamber above the piston, a water outlet tube having its inner end opening into the lower end of said compression chamber, a relief valve controlling the passage of water through said tube, and a float arranged to control the opening and closing of said relief valve.

5. A float-controlled valve comprising a valve body having a piston chamber open to water under pressure, an inwardly opening main valve in said chamber, said valve being equipped with a throttling plug arranged to gradually vary the size of the valve opening, a piston in said chamber of less diameter than said chamber, said piston being formed with a peripheral groove, a plurality of radially movable arcuate members in said groove, an air-compression chamber communicating with said piston chamber above the piston, a water outlet tube having its inner end opening into the lower end of said compression chamber, a relief valve controlling the passage of water through said tube, and a float arranged to control the opening and closing of said relief valve.

6. A float-controlled valve comprising a valve body having a piston chamber open to water under pressure, an inwardly opening main valve in said chamber, said valve being equipped with a throttling plug arranged to gradually vary the size of the valve opening, a piston in said chamber of less diameter than said chamber, said piston being formed with a peripheral groove, a plurality of radially movable arcuate plates in said groove, said plates being of less width than said groove, an air-compression chamber communicating with said piston chamber above the piston, a water outlet tube having its inner end opening into the lower end of said compression chamber, a relief valve controlling the passage of water through said tube, and a float arranged to control the opening and closing of said relief valve.

7. A float-controlled valve comprising a valve body having a piston chamber open to water under pressure, an inwardly opening main valve in said chamber, a loosely mounted piston in said chamber connected with said valve and having a larger pressure area than said valve, an air-compression chamber communicating with said piston chamber above the piston, a water outlet tube extending downwardly into and terminating adjacent the lower end of said compression chamber, a relief valve at the lower end of said tube having a valve stem within and extending upwardly beyond the top of said tube, and a float connected to said valve stem.

In testimony whereof, I have subscribed my name.

ROBERT A. BROOKS.